United States Patent [19]

Chiolle et al.

[11] Patent Number: 5,173,528

[45] Date of Patent: Dec. 22, 1992

[54] ELASTOMERIC THERMOPLASTIC COPOLYESTERS ENDOWED WITH HIGH RHEOLOGICAL AND MECHANICAL PROPERTIES AND AN IMPROVED AGEING RESISTANCE

[75] Inventors: Antonio Chiolle; Gian P. Maltoni, both of Ferrara; Romolo Stella, Rovigo; Alfio Vecchi, Ferrara, all of Italy

[73] Assignee: Ausimont S.R.L., Milan, Italy

[21] Appl. No.: 548,561

[22] Filed: Jul. 5, 1990

[30] Foreign Application Priority Data

Jul. 5, 1989 [IT] Italy ................................ 21094 A/89

[51] Int. Cl.⁵ .......................... C08K 5/34; C08K 5/29
[52] U.S. Cl. ........................................ 524/87; 524/195
[58] Field of Search .................................. 524/87, 195

[56] References Cited

U.S. PATENT DOCUMENTS

| | | |
|---|---|---|
| 3,362,929 | 1/1968 | Kehe . |
| 3,362,930 | 1/1968 | Kehe . |
| 3,776,882 | 12/1973 | Witzler ............................ 524/195 |
| 3,852,101 | 12/1974 | Batchelor, Jr. .................... 524/195 |
| 3,896,078 | 7/1975 | Hoeschele ........................ 524/87 |
| 3,975,329 | 8/1976 | Barnewall et al. ................ 524/195 |
| 4,064,103 | 12/1977 | Cordes et al. .................... 524/195 |
| 4,069,195 | 1/1978 | Layer et al. ...................... 524/87 |
| 4,073,770 | 2/1978 | Son et al. ......................... 524/87 |
| 4,113,676 | 9/1978 | Niederst .......................... 524/195 |
| 4,929,656 | 5/1990 | Golder ............................ 524/195 |

FOREIGN PATENT DOCUMENTS 1694318  4/1971  Fed. Rep. of Germany .

OTHER PUBLICATIONS

European Search Report dated Oct. 10, 1990.

*Primary Examiner*—Kriellion S. Morgan
*Attorney, Agent, or Firm*—Morgan & Finnegan

[57] ABSTRACT

A rheological and mechanical properties and the ageing resistance of the elastomeric thermoplastic copolyesters are remarkably improved by the addition of a synergistic mixture of a polycarbodiimide and a quinolinic antioxidant.

The copolyesters containing the above synergistic mixture find use in the extrusion technology.

Said copolyesters, when they are subjected to a heat treatment at a temperature lower than 150° C., increase the melt viscosity so that they can be used in the blow-molding technology.

15 Claims, No Drawings

ELASTOMERIC THERMOPLASTIC COPOLYESTERS ENDOWED WITH HIGH RHEOLOGICAL AND MECHANICAL PROPERTIES AND AN IMPROVED AGEING RESISTANCE

DESCRIPTION OF THE INVENTION

The present invention relates to elastomeric thermoplastic copolyesters endowed with high rheological and mechanical properties and improved ageing resistance.

More particularly, the present invention relates to elastomeric thermoplastic copolyesters endowed with high rheological and mechanical properties, improved ageing resistance and high melt viscosity, particularly suitable for being transformed into shaped articles both by extrusion and by blow-molding.

The elastomeric thermoplastic copolyesters are materials distinguishing in the rubber field by their high physical and mechanical properties, such as fatigue resistance, impact resistance and oil and gasoline resistances, within a large range of temperatures, particularly up to 120° C. However, they exhibit low melt viscosity, therefore they are not suitable for being transformed into shaped articles by the extrusion or blow-molding technologies.

It is known that the melt viscosity of the polyesters may be increased by using the solid regradation of the polymers. This process, as known, consists in heating the polymer in the solid state, at a temperature near the boiling points of the glycols present in the polymeric chain. Thus, in the case of polybutylene terephthalate (PBT) and of polyethylene terephthalate (PET), such a temperature is about 180°-220° C.

In the case of the elastomeric thermoplastic copolyesters, which have a melting temperature near or lower than the boiling temperatures of the glycols, said regradation process cannot be advantageously carried out, since it involves the melting or the syntherization of the polymer.

For overcoming this drawback, the regradation process should be carried out at temperatures lower than 150° C., however in this case the time required to reach the desired viscosities is very long, such as, for example, 30-50 days. Therefore, this process is not industrially applicable.

It is known, furthermore, that the elastomeric thermoplastic copolyesters exhibit poor resistance to thermo-oxydation, to hydrolysis and to light.

In order to improve the resistance to hydrolysis of the ester groups as well as the resistance against thermo-oxydation and light, it is known to add polycarbodiimides in U.S. Pat. Nos. 3,193,522 and 3,193,524.

These compounds, however, are effective to a certain extent, since the polycarbodiimides having low molecular weight are readily extracted by solvents or mineral oils, they have a tendency to migrate to the surface and become ineffective at high temperatures because they have a tendency to undergo polymerization, thereby destroying the reactivity of the carbodiimide group and thus the stabilization action of the composition.

Other carbodiimides such as, for example, those containing other functional groups, such as hydroxyl group, have been proposed as stabilizing agents; however, also these compounds are capable of reacting with themselves, and often the activity is lost following the storability.

To overcome all the above drawbacks, it has been proposed the use, as stabilizers for copolyesters, of polycarbodiimides having a molecular weight of at least 500 and having at least 3 carbodiimide groups in the molecule (see U.S. Pat. No. 3,193,522).

However, the mechanical properties of the thus obtained polyesters are not again completely satisfactory for well determined uses wherein high stabilities to thermo-oxydation and hydrolysis as well as high melt viscosity are required, as requested in the blow-molding technology.

It has been surprisingly found now that all the above reported drawbacks can be overcome and elastomeric thermoplastic copolyesters exhibiting improved rheological and mechanical properties and high resistance to ageing may be obtained, if said copolymers are added with a stabilizing system constituted by a synergistic mixture of a polycarbodiimide and of a quinolinic antioxidant.

The suitable quinolinic antioxidant is that having the general formula (I):

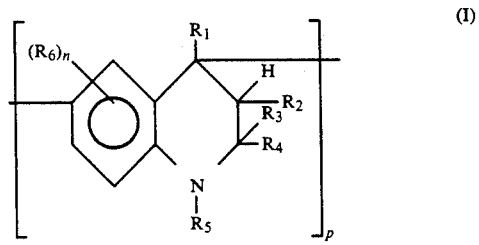

wherein:
$R_1$, $R_3$, $R_4$ and $R_5$ may be, equal or different from each other, a hydrogen atom or an alkyl radical containing from 1 to 4 carbon atoms;

$R_2$ may be hydrogen, an alkyl radical containing from 1 to 4 carbon atoms or a phenyl radical;

$R_6$ may be hydrogen, an alkyl radical containing from 1 to 4 carbon atoms, an aromatic radical containing from 6 to 18 carbon atoms, a cycloaliphatic radical containing from 3 to 6 carbon atoms, a halogen or a hydroxylic group;

n may be zero or an integer comprised between 1 and 4, and p is an integer comprised between 2 and 20 and preferably between 2 and 10.

Furthermore, it has been found that the copolyesters containing the above reported synergistic system, subject matter of the present invention, when they are subjected to a heat treatment in the solid state at a temperature lower than 150° C., undergo a quick regradation process with a prominent increase of the melt viscosity and a further improvement of the mechanical properties, particularly in terms of tensile strength, tear strength and resistances against thermoxydation, hydrolysis, oils and gasolines. This improvement of the mechanical properties can not be found in the polyesters as such or added with other stabilizing agents.

The subject matter of the present invention is, therefore, the elastomeric thermoplastic copolyesters containing an effective amount of a stabilizing system constituted by a synergistic mixture of a polycarbodiimide and a quinolinic antioxidant of the above reported general formula (I).

The amount of the stabilizing system is comprised between 0.01 and 10% by weight with respect to the elastomeric copolyester, and preferably between 0.2 and 5% by weight.

The weight ratio between the polycarbodiimide and the quinolinic antioxidant in the synergic system of the present invention can be varied within a large range even if ratios higher than 1 are preferred; particularly a polycarbodiimide antioxidant ratio of 2:1 has been found particularly advantageous.

A further subject mather of the present invention is the elastomeric thermoplastic copolyesters having the above reported stabilizing composition and after subjected to a heat treatment at a temperature lower than 150° C. in air atmosphere, preferably between 100° and 140° C., and for a time variable between 2 and 100 hours, preferably between 4 and 50 hours.

Any polycarbodiimide may be used for achieving the objects of the present invention. Particularly suitable are those described in U.S. Pat. Nos. 3,193,522; 2,941,983; 3,929,733; 3,193,524; 3,522,303, the contents of which is integral part of the present invention.

The aromatic polycarbodiimides having the following general formula (II) are, however, particular preferred:

$$R'-N=C=N-\left[\phantom{x}\bigcirc\phantom{x}-N=C=N-\right]_m R'$$ (II)

wherein:
R' is phenyl, $C_1$-$C_6$ alkyl-phenyl, $C_1$-$C_6$ alkoxyl-phenyl, phenyl substituted by halogens, or cyclohexyl; and
m is an integer from 10 to 50.

These compounds are known on the market such as, for example, STABAXOL P 100 traded by RHEIN-CHEMIE RHEINAU Gmbh.

Any known quinolinic antioxidant of formula (I) may be used in the stabilizing system of the present invention.

However, the quinolinic antioxidant having the following formula are particularly preferred for achieving objects of the present invention:

$$\left[\phantom{x}\bigcirc\phantom{x}\begin{array}{c}CH_3\\CH_3\\CH_3\\N\\H\end{array}\right]_p$$ (III)

wherein p is an integer comprised between 2 and 10.

These antioxidants are known in the market with the trade mark ANOX HB, traded by ENICHEM SINTESI S.p.A. Pedrengo (BG), Italia.

Any elastomeric thermoplastic copolyester containing ester bonds $$(-\overset{O}{\underset{\|}{C}}-O-)$$

may be stabilized by the synergistic mixtures of the present invention, provided that said polyesters exhibit a softening or melting temperature lower than 250° C., which is the temperature at which the stabilizing system is no more effective.

The elastomeric thermoplastic copolyesters having a segmented structure are, however, particularly preferred. These elastomeric thermoplastic copolyesters consist of a multiplicity of repeating long-chain ester units connected to each other head-to-tail through linkages of the ester type. Said long-chain ester units are represented by the formula:

$$-O-G-O-\overset{O}{\underset{\|}{C}}-R-\overset{O}{\underset{\|}{C}}$$ (IV)

and said short-chain units are represented by the formula:

$$-O-D-O-\overset{O}{\underset{\|}{C}}-R-\overset{O}{\underset{\|}{C}}$$ (V)

wherein:
G is a divalent radical remaining after the removal of the hydroxyl end groups from a poly-(alkylene oxide)-glycols having a molecular weight comprised between about 250 and 6.000 and a carbon-/oxygen ratio of about 1.8–4.3;
R is a divalent radical remaining after the removal of the carboxyl groups from a dicarboxylic acid having a molecular weight lower than about 300; and
D is a divalent radical remaining after the removal of hydroxyl groups from a diol having a molecular weight lower than about 250.

In said copolyesters the short-chain ester units having the above formula (V) are in an amount of about 15-95% by weight, and preferably 33-86% by weight, with respect to the weight of the copolyester, the remaining part being constituted by long-chain ester having the above formula (IV).

Said elastomeric copolyesters are well known in the literature, for example, by patents U.S. Pat. Nos. 3,023,192 and 3,651,015; Italian patent Nos. 947,589; 963,309 and 973,059 and by Italian patent application No. 21,212 filed on Jul. 4, 1988 in the name of the Same Applicant.

The expression "long-chain ester chains" relates to the reaction product of a poly(alkylenoxide) glycol with a dicarboxylic acid, in order to form ester units represented by the above formula (IV).

As poly(alkylenoxide) glycols may be used those containing from 2 to 10 carbon atoms in the alkylene radical, such as poly-(1,2- and -1,3-propylene oxide)-glycol, poly-(tetramethylene oxide)-glycol, poly-(pentamethylene oxide)-glycol, poly-(hexamethylene oxide)-glycol, poly-(heptamethylene oxide)-glycol, poly-(octamethylene oxide)-glycol, poly-(nonamethylene oxide)-glycol, poly-(decamethylene oxide), and poly-(1,2-butylene oxide)-glycol; polybutene-1-polybutadiene OH terminated; random copolymers or block copolymers of ethylene oxide and 1,2-propylene oxide; and the like.

Poly-(tetramethylene oxide)-glycol is particularly preferred in the instant invention.

The expression "short-chain ester units" relates to the product of reaction of a diol having a low molecular weight (lower than about 250) with a dicarboxylic acid in order to form ester units represented by the Formula (V) above reported.

Among the diols having a low molecular weight which react in order to form short-chain ester chains, non-cyclic, alicyclic and aromatic di-hydroxy compounds are included. Diols of from 2 to 15 carbon atoms such as ethylene-glycol, propylene-glycol, isobutylene-glycol, tetramethylene-glycol, pentamethylene-glycol, 2,2-dimethyl-trimethylene-glycol, hexamethylene-glycol and decamethylene glycol, dihydroxycyclohexane, cyclohexane-dimethanol, resorcinol, hydroquinone, 1,5-di-hydroxy-naphthalene, and so forth, are preferred.

Particularly preferred are aliphatic diols containing from 2 to 8 carbon atoms.

Examples of di-hydroxyl-aromatic compounds which may be used are bisphenols, such as bis-(p-hydroxy)-diphenyl, bis-(p-hydroxyphenyl)-methane, and bis-(p-hydroxyphenyl)-propane.

The expression "low-molecular-weight diols" used in the present context should hence be understood as including all of the derivatives suitable for forming esters, on condition that the requisite relevant to the molecular weight is only referred with respect to the diol, and not to the derivatives thereof.

However, 1,4-butane-diol is particularly preferred for the purpose of the present invention.

Dicarboxylic acids which are reacted with the above poly(alkylenoxide) glycols and with the diols having a low molecular weight in order to produce the copolyesters according to the present invention are aliphatic, cycloaliphatic or aromatic dicarboxylic acids having a low molecular weight, i.e., having a molecular weight lower than about 300. The herein used expression "dicarboxylic acids" encompasses also equivalent derivatives of dicarboxylic acids which show a behavior substantially similar to that of the dicarboxylic acids in the reaction with glycols and diols for the formation of the copolyester polymers. These equivalent compounds include esters and ester-forming derivatives, such as, e.g., halides and anhydrides. The molecular weight requisite relates to the acid, and not to its ester equivalent, or to its derivatives suitable for forming esters.

Therefore, within the definition of "dicarboxylic acid" also an ester of a dicarboxylic acid having a molecular weight higher than 300, or an equivalent of a dicarboxylic acid having a molecular weight higher than 300 are included, on condition that the corresponding acid has a molecular weight lower than about 300. The dicarboxylic acids may contain any substituent group whatever, or any combination of substituent groups which do not interfere to a substantial extent with the formation of the copolyester polymer and with the use of the polymer in the end product according to the present invention.

Within the context of the present invention, by aliphatic dicarboxylic acids, those carboxylic acids are meant that contain two carboxylic groups, with each of said carboxylic groups being bonded to a saturated carbon atom. If the carbon atom to which the carboxylic group is bonded is a saturated one and is located in a ring, the acid is cycloaliphatic. Generally, the aliphatic acids or the cycloaliphatic acids containing an unsaturation of the conjugated type cannot be used, in that they are liable to homopolymerize. However, certain unsaturated acids, such as, e.g., maleic acids, may be used.

The aromatic dicarboxylic acids, according to the expression used in the instant context, are those dicarboxylic acids which contain two carboxylic groups, each carboxylic group being bonded to a carbon atoms in either an isolated or a condensed aromatic ring structure. It is not necessary that both of said functional carboxylic groups be bonded to a same aromatic ring, and, when more than one ring is present in the molecule, they may be linked by aliphatic or aromatic divalent radicals, or by divalent radicals such as, e.g., —O— or —SO$_2$—, or even by a simple bond.

Examples of aliphatic and cycloaliphatic dicarboxylic acids which may be used according to the present invention are sebacic acid, 1,3-cyclohexane-dicarboxylic acid, 1,4-cyclohexane-dicarboxylic acid, adipic acid, glutaric acid, succinic acid, oxalic acid, azelaic acid, diethyl-malonic acid, allyl-malonic acid, 4-cyclohexene-1,2-dicarboxylic acid, 2-ethyl-suberic acid, 2,2,3,3-tetramethyl-succinic acid, cyclopentane-dicarboxylic acid, decahydro-1,5-naphthalene-dicarboxylic acid, 4,4'-dicyclohexyl-dicarboxylic acid, decahydro-2,6-naphthalene-dicarboxylic acid, 4,4'-methylene-bis-(cyclohexyl)-carboxylic acid, 3,4-furane-dicarboxylic acid, 1,1-cyclobutane-dicarboxylic acid, and so forth. Cyclohexane-dicarboxylic acid and adipic acid are preferred dicarboxylic acids.

Examples of aromatic dicarboxylic acids which may be used comprise phthalic acid, isophthalic acid and terephthalic acid, dibenzoic acid, dicarboxylic compounds substituted with two benzene rings, such as, e.g., bis-(para-carboxyl-phenyl)-metane, para-oxy-(para-carboxyl-phenyl)benzoic acid, ethylene-bis-(para-oxy-benzoic acid), 1,5-naphthalene-dicarboxylic acid, 2,6-naphthalene-dicarboxylic acid, 2,7-naphthalene-dicarboxylic acid, phenanthrolene-dicarboxylic acid, anthralene-dicarboxylic acid, 4,4'-sulfonyl-dibenzoic acid and their $C_1$-$C_{12}$-alkyl derivatives and derivatives resulting from substitution on the ring, such as, e.g., halogenated derivatives, alkoxy derivatives, and aryl derivatives.

Aromatic acids containing a hydroxyl group, such as, e.g., para-($\beta$-hydroxyl-ethoxy)-benzoic acid, may also be used, on condition that an aromatic dicarboxylic acid is also present.

The aromatic dicarboxylic acids constitute a preferred class for the preparation of the copolyester polymers according to the present invention.

Among the aromatic acids, those which contain from 8 to 16 carbon atoms are preferred: particularly preferred are phenylene-dicarboxylic acids, i.e., phthalic acid, isophthalic acid and terephthalic acid. In particular, either terephthalic acid alone or a mixture of terephthalic acid and isophthalic acid are preferred.

At least about 70% by mol of the dicarboxylic acid included in the polymer should preferably be constituted by terephthalic acid, i.e., about 70% of the "R" groups in the formulae (IV) and (V) above, are preferably 1,4-phenylene radicals.

The carboxylic acids and their derivatives and the polymeric glycols are included in the end product in the same molar proportions in which they are contained in the reaction mixture. The amount of low-molecular weight diol actually included in the end product corresponds to the difference between the mols of diacid and the mols of polymeric glycol contained in the reaction mixture.

The most preferred copolyesters of the present invention are those which are prepared from dimethyl terephthalate (DMT), 1,4-butanediol (BD), and polytetramethylene-glycol (PTMG) having a molecular weight comprised between 250 and 2.000.

The polymers of the present invention may be suitable prepared by means of a normal transesterification reaction. A preferred process consists in heating at 150°-230° C., the ester of the dicarboxylic acid, for example the dimethyl ester of terephthalic acid with the poly(alkylene oxide) glycol and a molar excess of a diol in the presence of a catalyst. The amount of the diol is at least 1.1 and preferably at least 1.5 of diol for each mole of acid.

The heating is continued until the removal of methanol is essentially complete.

The molecular weight of the resulting prepolymer is then increased by distilling off the excess of the low-molecular-weight diol (polycondensation). During this distillation, a further transestererification occurs, which leads to an increase in molecular weight and to a random distribution of the various copolyester units in the molecule.

In order to avoid an excessively long dwell time of the polymer at a high temperature with the possibility of an irreversible thermal degradation, catalysts for the ester interchange reaction are advantageously employed. While a wide variety of catalysts may be used, the organic titanates, such as, e.g., titanium tetrabutylate, either alone or in combination with magnesium or calcium acetates, are preferred. Also complex titanates derived from alkali metal alkoxides or alkaline-earth metal alkoxides and esters of titanic acid, are found to be efficacious. Inorganic titanates, such as lanthanum titanate, mixtures of calcium acetate and antimony dioxide, and lithium and magnesium alkoxides are further examples of catalysts which may be used.

The ester interchange polymerizations are generally carried out in the molten state, but inert solvents may also be used to facilitate the removal of volatile components from the mass at low temperatures.

During the preparation of the elastomeric thermoplastic copolyester is conventional technique to add a stabilizer in order to prevent an oxidative degradation of the reagents and of the polymer during its shaping. The known phenolic stabilizers may be used for this purpose.

The synergistic mixture of polycarbodiimide and quinolinic stabilizer of formula (I) may be added to the copolyester either during the polycondensation reaction either at the end of this reaction when the copolyester is again in the melt state, or after this reaction in a separate step by re-melting the copolyester. The synergistic mixture may be added in the form of a solid, a liquid in the melt state or in solution or dispersion into one or more of the reagents. It is generally suitable to add the synergistic mixture in the solid form to the finished copolyester by melt blending.

In this case, it is preferred to prepare a master batch of the stabilizer, for example having an amount of synergistic mixture of 20-40% by weight, and then to dilute this master batch with the pure copolyester. This blending is carried out in an extruder at a temperature comprised between 150°-280° C., depending on the particular type of copolyester; the extruder may be of mono-screw or bi-screw type, preferably equipped with venting, or a Banbury. The copolyesters stabilized by the synergistic mixture of the present invention exhibit a high resistance to thermo-oxidation, hydrolysis and light. Furthermore, when said stabilized copolyesters are subjected to heating treatments at a temperature lower than 150° C., such as, for example, at 100°-140° C., they undergo a surprising increase of the melt viscosity which indicates an increase of the molecular weight without any degradation.

The heat treatment involves, moreover, a relevant increase of the mechanical properties such as tensile strength, tear strength, fatigue strength and the like.

Owing to these peculiar properties, the stabilized copolyesters of the present invention find use for producing hydraulic pipes, coatings for cables, elastic supports for bumpers, bellows for covering joints or couplings, composite gaskets to be used at high temperatures, and so forth.

The characteristics of the copolyesters of the present invention may be further modified by the introduction of various conventional inorganic fillers, such as, e.g., carbon black, silica gel, alumina, clay, fiberglass, and so forth. In general, the effect of these additives is to increase the modulus of the material, but to the detriment of the elongation, tearing strength, and abrasion resistance.

Besides the above, the product may be rendered flameproof (UL 94 Class: V2, V0, etc.) by the addition of various flame-proofing systems containing aromatic halides, or of new types of flame-proofing systems containing aliphatic halides or not containing halogens, in amounts ranging from 5 to 45% by weight, referred to the end product. The materials according to the present invention, to which the last two types of cited flame-proofing systems are added, have better flame behavior characteristics than those of the traditional segmented thermoplastic copolyesters, and are capable of passing the "Steiner 20 Foot Tunnel Test" as prescribed by UL 910, and may be given a rating of V0 in the "vertical test" according to UL 94.

As conventional flame-proofing systems, there may be used decabromo-bisphenol A with $Sb_2O_3$ in the mutual ratio of 1.5:1, or new types of flame-proofing substances such as melamine hydrobromide (see Italian patent application No. 20548 A/85) combined with $Sb_2O_3$ in the mutual ratio of 3:1, or, finally, synergistic systems not containing halogens, such as acid piperazine pyrophosphate combined with melamine phosphate, in a mutual ratio within the range of from 3:1 to 1:1 (Italian patent application No. 21,149 A/83).

The copolyesters, stabilized and rendered flameproof by the addition of the above reported products, show an optimum combination of characteristics in terms of:
  speed of extrusion of the sheaths;
  aesthetic appearance;
  low smoke value;
  high oxygen index;
  low development rate of the flame; and
  absence of dripping during the combustion.

EXAMPLES

In order to make the present invention still better understood, some examples are reported below which are of a merely illustrative character, and no way are limitative of the invention. Unless differently specified, all parts, proportions and parameters reported in the following are by weight.

EXAMPLES 1-4

Dimethyl-terephthalate, optionally isophthalic acid, 1,4-butene-diol, polytetra (methylene) glycol (PTMG) having different molecular weight and of the type and in the amounts listed in Table I were charged into autoclave equipped with a distillation column, variable-speed stirring means and a temperature control system.

The temperature was gradually increased up to 140°–150° C. over about 1 hour, and 150 ppm of Ti (OBu)₄ previously dissolved in a few ml of butane diol (about 10–20 cm³), was added after a short induction time, the reaction of transesterification started; this reaction was evidenced by an increase in column overhead of the temperature to about 65° C., which demonstrated the removal of methanol. The temperature of the reaction mass was gradually increased up to 205° C. (during a 2-hour time) and was kept constant at this value until the end of the methanol distillation.

150 ppm of catalyst (titanium tetrabutylate) and about 4000 ppm of phenolic stabilizer, Irganox 1010 produced and marked by CIBA GEIGY were added and vacuum was gradually applied until a residual pressure of about 0.05 mm$_{Hg}$ was reached, within a time of about 30 minutes, and heating was continued until an internal temperature of about 250° C. was reached.

When the product reached the desired viscosity, about 200–6000 MPa at 232° C., the polymer was discharged by extrusion onto a water-cooled conveyor belt, and was chopped into small cubic granules.

The properties of the obtained copolyesters are listed in Table I.

TABLE I

|  | Method | UNITS | Examples 1 | 2 | 3 | 4 |
|---|---|---|---|---|---|---|
| Monomers | | | | | | |
| Dimethylterephthalate | | | 455 | 498 | 644 | 613 |
| Isophthalic acid | | | | | | 23 |
| 1,4-butenediol | | | 212 | 244.6 | 353 | 224 |
| PTMG having mol. weight 250 | | | | | | 263 |
| PTMG having mol. weight 650 | | | | | | 117 |
| PTMG having molecular weight 1000 | | | 530 | 477.8 | 296 | — |
| PROPERTIES | | | | | | |
| Melting point | D 2117 | °C. | 182 | 191 | 209 | 160.5 |
| Glass transition temperature | DIN 53445 | °C. | −60 | −50 | −12 | −41 |
| Melt index at 230° C. and 2.16 kg | D 1238 | g/10′ | 20 | 18 | 18 | 21 |

EXAMPLE 5

The elastomeric thermoplastic copolyester of example 2 was mixed at 190° C.–195° C. in a double-screw extruder MARIS M33 type, with 20% by weight of a stabilizer listed in Table II. The thus obtained master was added to the respective pure copolymer so as to obtain compounds containing 3% by weight of stabilizer. The stabilized products was injection molded at about 200° C. and the physical-mechanical and technological properties were measured.

The obtained values are listed in following Table II.

TABLE II

| | | | COPOLYESTER OF EXAMPLE 2 | | | |
|---|---|---|---|---|---|---|
| PROPERTIES | METHOD | UNITS | Pure product | ANOX HB | STABAXOL P 100 | ANOX HB AND STABAXOL P100 1:2 |
| Hardness | D 2240 | Points | 46 | 46 | 46 | 46 |
| Tensile strength | D 638 | MPa | 23 | 23 | 23 | 24 |
| Elongation at break | D 638 | % | 800 | 800 | 800 | 810 |
| Melt Index at 230° C. and 2.16 KG. | D 1238 | g/10′ | 18 | 17 | 10 | 3.4 |
| **RESISTANCE TO WATER(\*)** | | | | | | |
| Tensile strength | D 638 | MPa | 16 | 16 | 17 | 24 |
| Elongation at break | D 638 | % | 170 | 180 | 300 | 790 |
| **RESISTANCE TO OIL(\*\*)** | | | | | | |
| Tensile strength | D 638 | MPa | 19 | 20 | 22 | 24 |
| Elongation at break | D 638 | % | 830 | 830 | 750 | 770 |
| **RESISTANCE TO THERMO-OXIDATION(\*\*\*)** | | | | | | |
| Tensile strength | D 638 | MPa | 16 | 20 | 22 | 27 |
| Elongation at break | D 638 | % | 400 | 770 | 700 | 770 |

(\*)The resistance to water was determined after dipping of the sample in water at 100° C. for 7 days.
(\*\*)The resistance to oil was determined after dipping in oil ASTM N.3 at 100° C. for 7 days.
(\*\*\*)The resistance to thermo-oxidation was determined after standing in oven at 121° C. for 7 days.

EXAMPLES 6–8

By operating according to the process conditions of example 5, stabilizing compositions with the copolyesters of examples 1, 3 and 4 were prepared.

The properties of the stabilized compositions thus obtained are listed in the following Table III.

TABLE III

| | | | COPOLYESTER OF EXAMPLE | | | | | |
|---|---|---|---|---|---|---|---|---|
| | | | 1 | | 3 | | 4 | |
| PROPERTIES | METHOD | UNITS | Pure product | ANOX HB + STABAXOL P100 1:2 | Pure product | ANOX HB + STABAXOL P100 1:2 | Pure product | ANOX HB + STABAXOL P100 1:2 |
| Tensile strength | D 638 | MPa | 19 | 20 | 34 | 35 | 18 | 19 |
| Break elongation | D 638 | % | 800 | 850 | 700 | 720 | 850 | 870 |
| Melt Index | D 1238 | g/10′ | 20 | 6 | 18 | 4.8 | 21 | 7 |
| RESISTANCE TO WA- | | | | | | | | |

TABLE III-continued

| PROPERTIES | METHOD | UNITS | COPOLYESTER OF EXAMPLE | | | | | |
|---|---|---|---|---|---|---|---|---|
| | | | 1 | | 3 | | 4 | |
| | | | Pure product | ANOX HB + STABAXOL P100 1:2 | Pure product | ANOX HB + STABAXOL P100 1:2 | Pure product | ANOX HB + STABAXOL P100 1:2 |
| TER(*) | | | | | | | | |
| Tensile strength | D 638 | MPa | 13 | 20 | 24 | 34 | 12 | 18 |
| Break elongation | D 638 | % | 180 | 840 | 150 | 700 | 200 | 860 |
| RESISTANCE TO OIL(**) | | | | | | | | |
| Tensile strength | D 638 | MPa | 17 | 21 | 28 | 36 | 16 | 20 |
| Break elongation | D 638 | % | 700 | 800 | 700 | 680 | 850 | 830 |

EXAMPLES 9-10

The stabilized copolyesters of examples 5 and 6 were subjected to a heat treatment in air-forced oven at 125° C. for 72 hours. After this treatment, the rheological properties were measured on the polymer granules and the physical-mechanical properties were measured on the products produced by injection molding at 190°-220° C.

The same results were obtained when the heat treatment was carried out at a residue pressure of 3 mm$_{Hg}$ at 125° C. for 72 hours.

TABLE IV

| PROPERTIES | METHOD | UNITS | COPOLYESTER OF EXAMPLE | |
|---|---|---|---|---|
| | | | 5 | 6 |
| Tensile strength | D 638 | MPa | 33 | 24 |
| Break elongation | D 638 | % | 870 | 900 |
| Melt index (232° C.) | D 1238 | g/10' | 0.7 | 1.5 |
| Melt viscosity | D 1238 | | | |
| at 210° C., = 10 sec$^{-1}$ | Met. B | Pa · s | 8100 | 6000 |
| at 210° C., = 100 sec$^{-1}$ | | Pa · s | 3000 | 2850 |
| at 210° C., = 1000 sec$^{-1}$ | | Pa · s | 850 | 650 |
| RESISTANCE TO WATER* | | | | |
| Tensile strength | D 638 | MPa | 30 | 23 |
| Break elongation | D 638 | % | 800 | 830 |
| RESISTANCE TO OIL** | | | | |
| Tensile strength | D 638 | MPa | 32 | 25 |
| Break elongation | D 638 | % | 850 | 870 |
| RESISTANCE TO THERMO-OXIDATION*** | | | | |
| Tensile strength | D 638 | MPa | 36 | 27 |
| Break elongation | D 638 | % | 780 | 830 |

The regradation kinetics of the stabilized copolyester of example 5 was as follows:

| TREATMENT TIME | MELT VISCOSITY a 210° C. $\gamma = 10$ sec$^{-1}$ | TENSILE STRENGTH (MPa) | ELONGATION AT BREAK % |
|---|---|---|---|
| 0 | 2900 | 24 | 810 |
| 24 h | 5150 | 31.3 | 860 |
| 72 h | 8100 | 33 | 870 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Elastomeric thermoplastic copolyesters endowed with high rheological and mechanical properties and an improved aging resistance, containing an effective amount of a stabilizing system constituted by a synergistic mixture of a quinolinic antioxidant, wherein the quinolinic antioxidant has formula:

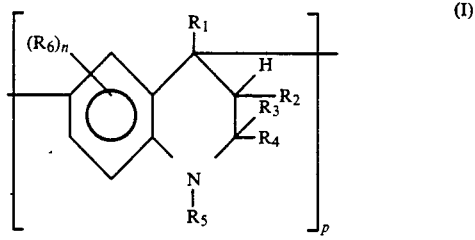

(I)

wherein:
R$_1$, R$_3$, R$_4$ and R$_5$ may be, equal or different from each other, a hydrogen atom or an alkyl radical containing from 1 to 4 carbon atoms;
R$_2$ may be hydrogen, an alkyl radical containing from 1 to 4 carbon atoms or a phenyl radical;
R$_6$ may be hydrogen, an alkyl radical containing from 1 to 4 carbon atoms, an aromatic radical containing from 6 to 18 carbon atoms, a cycloaliphatic radical containing from 3 to 6 carbon atoms, a halogen or a hydroxylic group;
n may be zero or an integer from 1 and 4, and
p is an integer between 2 and 20 and of a polycarbodiimide, wherein the polycarbodiimide has formula (II)

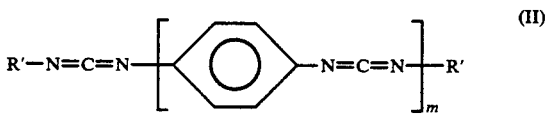

(II)

wherein:
R' is phenyl, C$_1$-C$_6$ alkyl-phenyl, C$_1$-C$_6$ alkoxyphenyl, phenyl substituted by halogens, or cyclohexyl; and
m is an integer from 10 to 150.

2. Elastomeric thermoplastic copolyesters according to claim 1, wherein the quinolinic antioxidant has formula:

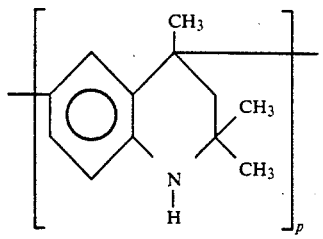 (III)

wherein p is an integer comprised between 2 and 10.

3. Elastomeric thermoplastic copolyesters according to claim 1, wherein
the amount of the stabilizing system is between 0.01 and 10% by weight with respect to the elastomeric copolyester.

4. Elastomeric thermoplastic copolyesters according to claim 1, wherein
the weight ratio between the polycarbodiimide and the quinolinic antioxidant is greater than 1.

5. Elastomeric thermoplastic copolyesters according to claim 3, wherein the weight ratio between the polycarbodiimide and the antioxidant is 2.

6. Elastomeric thermoplastic copolyesters according to claim 1, wherein said copolyester consists of a multiplicity of repeating long-chain ester units and of short-chain ester units joined to each other by head-to-tail connections through ester bonds; the long-chain ester units being represented by the formula:

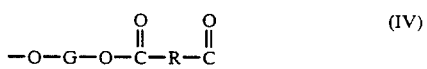 (IV)

and the short-chain units being represented by the formula:

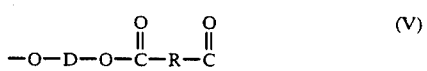 (V)

wherein:

G is a divalent radical remaining after the removal of the end hydroxyl groups from a poly-(alkylene oxide)-glycol having a molecular weight between approximately 250 and 6000 and a carbon/oxygen ratio of approximately 1.8–4.3;

R is a divalent radical remaining after the removal of the carboxyl groups from a diol having a molecular weight lower than about 250.

7. Elastomeric thermoplastic copolyesters according to claim 6, wherein the short-chain ester units corresponding to the above formula (V) are in an amount of about 15–95% by weight, with respect to the weight of the copolyester, the remaining part being constituted by long-chain ester units corresponding to the formula (IV).

8. Elastomeric thermoplastic copolyesters according to claim 1, wherein the copolyesters are regraded by a heat treatment in the solid state at a temperature lower than 150° C.

9. Elastomeric thermoplastic copolyesters according to claim 8, wherein the heat treatment is carried out between 100° and 140° C. for a time varying between 2 and 100 hours.

10. Elastomeric thermoplastic copolyesters according to claim 1, wherein the copolyester contains from 5 to 45% by weight of a flame-proofing agent selected from the aromatic halides, aliphatic halides and the synergistic flame-proof systems not containing halogens.

11. Elastomeric thermoplastic copolyesters according to claim 3, wherein the amount of the stabilizing system is between 0.2 and 5% by weight.

12. Elastomeric thermoplastic copolyesters according to claim 7, wherein the short-chain ester units are in an amount between 33 and 86% by weight.

13. Elastomeric thermoplastic copolyesters according to claim 9, wherein the time is between 4 and 15 hours.

14. The copolyesters of claim 1, wherein p is an integer between 2 and 10.

15. The elastomeric thermoplastic copolyesters of claim 1, wherein the stabilizing system is incorporated into the elastomeric thermoplastic copolyesters.

* * * * *